Patented July 4, 1933

1,916,286

UNITED STATES PATENT OFFICE

MARION C. REED, OF SOUTH CHARLESTON, WEST VIRGINIA, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Original application filed November 4, 1929, Serial No. 404,868. Divided and this application filed April 27, 1932. Serial No. 607,888.

This invention relates to the art of preserving rubber, either in the vulcanized or unvulcanized condition, and to rubber compositions so preserved.

It is well known that rubber is subject to more or less rapid deterioration upon aging, especially when exposed to light, heat, or air. It has been proposed to treat rubber with so-called "anti-oxidants" or age-resisters for the purpose of retarding its deterioration and extending the period of its usefulness. Such previously known anti-oxidants include phenolic compounds, aromatic amino compounds, and the condensation products of aldehydes and amines.

This invention consists in treating rubber with a member of a new class of age-resisters, the said class comprising secondary amines, one of the substituents of which is a monovalent aliphatic hydrocarbon group while the other is an aromatic group containing more than one aromatic ring. The aliphatic group may be any straight or branched chain aliphatic hydrocarbon group, or alicyclic group, and may even contain aromatic rings remote from the point of attachment as in the benzyl group. The aromatic group may contain two or more aromatic rings, conjugated, adjacent or indirectly joined one to another. Thus, the class includes such substances as: methyl-alpha-naphthylamine, methyl-beta-naphthylamine, methyl-anthracylamine, methylamino-biphenyl, methylamino-diphenylmethane, methylamino-diphenyl ether, p-methylamino-diphenylamine, N methyl-N'-beta-naphthyl-p-phenylene diamine, p-methylamino-diphenyl-p-phenylene-diamine, 1-methylamino-4-naphthol, p-methylamino-p'-hydroxy-diphenyl ether, p,p' di-methylamino-diphenylamine, and the corresponding ethyl, propyl, butyl, amyl, heptyl, and other alkyl derivatives, as well as similar compounds containing other substituent groups such as the cyclopentyl cyclohexyl, and benzyl and phenyl-ethyl groups, which, although not strictly aliphatic in nature, undergo the characteristic reactions of and confer upon their compounds essentially the same properties as purely aliphatic groups; it being understood that the above-named compounds are merely illustrative of the scope of the class, and that many other related compounds are likewise included within the definition. Any one or a mixture of several of the above-mentioned class of age-resisters may be incorporated into rubber or a rubber composition with beneficial effects on its age-resisting properties, preferably from 0.2 to 5 parts by weight to 100 parts of rubber being used.

*Example 1.*—As a specific example of one embodiment of the method of this invention, a typical tire tread composition was prepared containing: blended plantation rubbers 100 parts by weight, sulfur 5.5 parts, zinc oxide 30 parts, gas black 40 parts, mineral rubber 10 parts, palm oil 5 parts, hexamethylene tetramine 0.75 parts, and methyl-alpha-naphthylamine 1.90 parts. The composition was thoroughly mixed, and vulcanized in a press for 45 minutes at 145° C. (294° F.) to produce an optimum cure. The rate of aging of the vulcanized composition was determined by measuring its tensile strength and elongation before and after aging. The accelerated aging test was carried out in the Geer aging oven, in which samples were maintained at a temperature of 70° C. (158° F.) in a constantly renewed stream of air, the results being recorded in the following table, in which T indicates ultimate tensile strength in pounds per sq. inch and E indicates ultimate elongation in per cent. of original length:

*Aging tests of methyl-alpha-naphthylamine*

|   | Before aging | After 2 days | After 5 days | After 7 days |
|---|---|---|---|---|
| T | 3835 | 3377 | 2912 | 2720 |
| E | 690 | 620 | 590 | 538 |

A similar composition without the methyl-alpha-naphthylamine deteriorated approximately twice as much in the same time.

*Example 2.*—A rubber composition similar to that specified in Example 1 above but without the methyl-alpha-naphthylamine was divided into 5 portions, one of which was used as a control. To the others were added respectively 0.95 parts (0.5% of the weight of the composition) of ethyl-alpha-naphthylamine, 2-isoamyl-alpha-naphthylamine, cyclohexyl-alpha-naphthylamine, and benzyl-alpha-naphthylamine. The compositions were vulcanized, and tested after aging in the Geer oven as described above, as well as after aging in the Bierer-Davis oxygen bomb, in which the samples were maintained in an atmosphere of oxygen at a pressure of 300 lbs. per sq. in. and at a temperature of 70° C. The results are shown below:

*Aging tests of alkyl-alpha-naphthylamines*

| Age-resister (0.5%) | Before aging | | After 7 days in the Geer oven | | After 48 hours in the Bierer-Davis bomb | |
|---|---|---|---|---|---|---|
| | T | E | T | E | T | E |
| None (control) | 3624 | 675 | 1792 | 440 | 839 | 362 |
| Ethyl-alpha-naphthylamine | 3588 | 673 | 2412 | 473 | 2387 | 570 |
| 2-isoamyl-alpha-naphthylamine | 3444 | 703 | 2952 | 640 | 2208 | 603 |
| Cyclohexyl-alpha-naphthylamine | 3471 | 677 | 1945 | 520 | 1438 | 500 |
| Benzyl-alpha-naphthylamine | 3648 | 670 | 2680 | 573 | 2155 | 583 |

From the examples given above it is evident that secondary amines of the above-described class, namely those possessing the general type formula

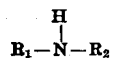

where $R_1$ is an alkyl group and $R_2$ is an aryl group containing at least two aromatic rings, are extremely effective in retarding the deterioration which rubber normally undergoes upon aging.

Obviously, the practice of this invention is not limited to the specific compositions given above, such compositions being merely illustrative of one manner of employing the age-resisters of this invention. The proportions of the constituents may be varied, or other substances may be substituted therefor, since this invention is applicable to pure rubber or rubber compositions of the most varied nature. The age-resisters may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the age-resisters into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents. The term "aliphatic", unless otherwise limited, is to be understood as including all substituent groups which confer the characteristic properties of alphatic compounds on their derivatives, as opposed to aromatic groups which confer different and distinctly aromatic properties on their derivatives, and particularly as including all groups hereinbefore referred to as aliphatic in nature.

This application is a division of my copending application Serial No. 404,868 filed November 4, 1929.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a substance of the general formula

where $R_1$ is a monovalent aliphatic hydrocarbon group and $R_2$ is an aromatic group containing at least two distinct aromatic rings.

2. The method of preserving rubber which comprises treating rubber with a substance of the general formula

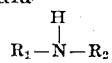

where $R_1$ is an alkyl group and $R_2$ is an aromatic group containing at least two distinct aromatic rings.

3. The method of preserving rubber which comprises treating rubber with a substance of the general formula

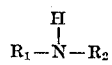

where $R_1$ is a monovalent aliphatic hydrocarbon group and $R_2$ is an aromatic hydrocarbon group containing at least two distinct aromatic rings.

4. The method of preserving rubber which comprises treating rubber with a substance of the general formula

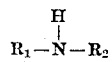

where $R_1$ is an alkyl group and $R_2$ is an aromatic hydrocarbon group containing at least two distinct aromatic rings.

5. The method of preserving rubber which comprises treating rubber with a substance of the general formula

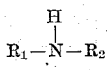

where $R_1$ is a monovalent aliphatic hydrocarbon group and $R_2$ is an aryl group containing two distinct but directly connected aromatic rings.

6. The method of preserving rubber which comprises treating rubber with a substance of the general formula

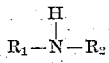

where $R_1$ is an alkyl group and $R_2$ is an aryl group containing two distinct but directly connected aromatic rings.

7. The method of preserving rubber which comprises treating rubber with a substance of the general formula

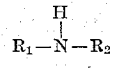

where $R_1$ is a monovalent aliphatic hydrocarbon group and $R_2$ is a biphenyl group.

8. The method of preserving rubber which comprises treating rubber with a monoalkyl aminobiphenyl.

9. The method of preserving rubber which comprises treating rubber with a substance of the general formula

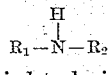

where $R_1$ is a straight chain alkyl group and $R_2$ is an aromatic group containing two distinct aromatic rings.

10. The method of preserving rubber which comprises treating rubber with a substance of the general formula

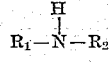

where $R_1$ is an ethyl group and $R_2$ is an aromatic group containing two distinct aromatic rings.

11. The method of preserving rubber which comprises treating rubber with a substance of the general formula

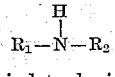

where $R_1$ is a straight chain alkyl group and $R_2$ is a biphenyl group.

12. The method of preserving rubber which comprises treating rubber with ethylamino biphenyl.

13. The method of preserving rubber which comprises treating rubber with a substance of the general formula

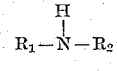

where $R_1$ is a monovalent aliphatic hydrocarbon group and $R_2$ is an aromatic group containing two distinct aromatic rings connected to an aliphatic nucleus.

14. The method of preserving rubber which comprises treating rubber with a substance of the general formula

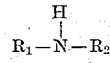

where $R_1$ is an alkyl group and $R_2$ is a diphenyl methane group.

15. The method of preserving rubber which comprises treating rubber with a substance of the general formula

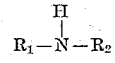

where $R_1$ is a butyl group and $R_2$ is an aromatic group containing two distinct aromatic rings.

16. The method of preserving rubber which comprises treating rubber with n-butylamino diphenylmethane.

17. The method of preserving rubber which comprises treating rubber with a substance of the general formula

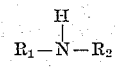

where $R_1$ is a monovalent aliphatic hydrocarbon group and $R_2$ is an aromatic group containing two distinct aromatic rings attached to a secondary amino nitrogen.

18. The method of preserving rubber which comprises treating rubber with a substance of the general formula

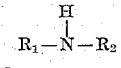

where $R_1$ is an alkyl group and $R_2$ is an aromatic group consisting of two aromatic rings attached to a secondary amino nitrogen.

19. The method of preserving rubber which comprises treating rubber with a substance of the general formula

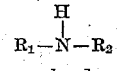

where $R_1$ is a branched chain alkyl group and $R_2$ is an aromatic group containing two distinct aromatic rings.

20. The method of preserving rubber which comprises treating rubber with a substance of the general formula

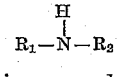

where $R_1$ is an isopropyl group and $R_2$ is an aromatic group containing two distinct aromatic rings.

21. The method of preserving rubber which comprises treating rubber with an isopropylamino diarylamine.

22. The method of preserving rubber which comprises treating rubber with p-isoproylamino diphenylamine.

23. The method of preserving rubber which comprises vulcanizing a mixture of rubber, sulphur, an active organic accelerator, and a substance of the general formula

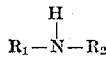

where $R_1$ is monovalent aliphatic hydrocarbon group and $R_2$ is an aromatic group containing at least two distinct aromatic rings.

24. The method of preserving rubber which comprises vulcanizing a mixture of rubber, sulphur, an active organic accelerator, and a substance of the general formula $$R_1-\underset{\underset{H}{|}}{N}-R_2$$

where $R_1$ is an alkyl group and $R_2$ is an aryl hydrocarbon group containing two distinct aromatic rings.

25. The method of preserving rubber which comprises vulcanizing a mixture of rubber, sulphur, an active organic accelerator and a substance of the general formula

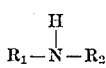

where $R_1$ is an alkyl group and $R_2$ is a diarylamine group.

26. A composition comprising rubber and a substance of the general formula

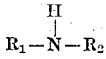

where $R_1$ is a monovalent aliphatic hydrocarbon group and $R_2$ is an aromatic group containing at least two distinct aromatic rings.

27. A composition comprising rubber and a substance of the general formula

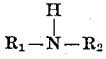

where $R_1$ is an alkyl group and $R_2$ is an aromatic group containing two distinct aromatic rings.

28. A composition comprising rubber and a substance of the general formula

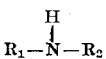

where $R_1$ is a straight chain alkyl group and $R_2$ is an aromatic group containing two distinct aromatic rings.

29. A composition comprising rubber and a substance of the general formula

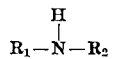

where $R_1$ is an ethyl group and $R_2$ is an aromatic group containing two distinct aromatic rings.

30. A composition comprising rubber and a substance of the general formula

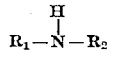

where $R_1$ is a butyl group and $R_2$ is an aromatic group containing two distinct aromatic rings.

31. A composition comprising rubber and a substance of the general formula

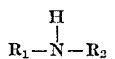

where $R_1$ is a branched chain alkyl group and $R_2$ is an aromatic group containing two distinct aromatic rings.

32. A composition comprising rubber and a substance of the general formula

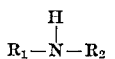

where $R_1$ is an alkyl group and $R_2$ is an aryl hydrocarbon group containing two distinct aromatic rings.

33. A composition comprising rubber and a substance of the general formula

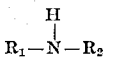

where $R_1$ is an alkyl group and $R_2$ is a biaryl group.

34. A composition comprising rubber and a substance of the general formula

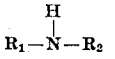

where $R_1$ is an alkyl group and $R_2$ is an aromatic group containing two distinct aromatic rings attached to a secondary amino nitrogen.

35. A composition comprising rubber and an alkylamino diphenylamine.

In witness whereof I have hereunto set my hand this 19th day of April, 1932.

MARION C. REED.